United States Patent Office 3,362,180
Patented Jan. 9, 1968

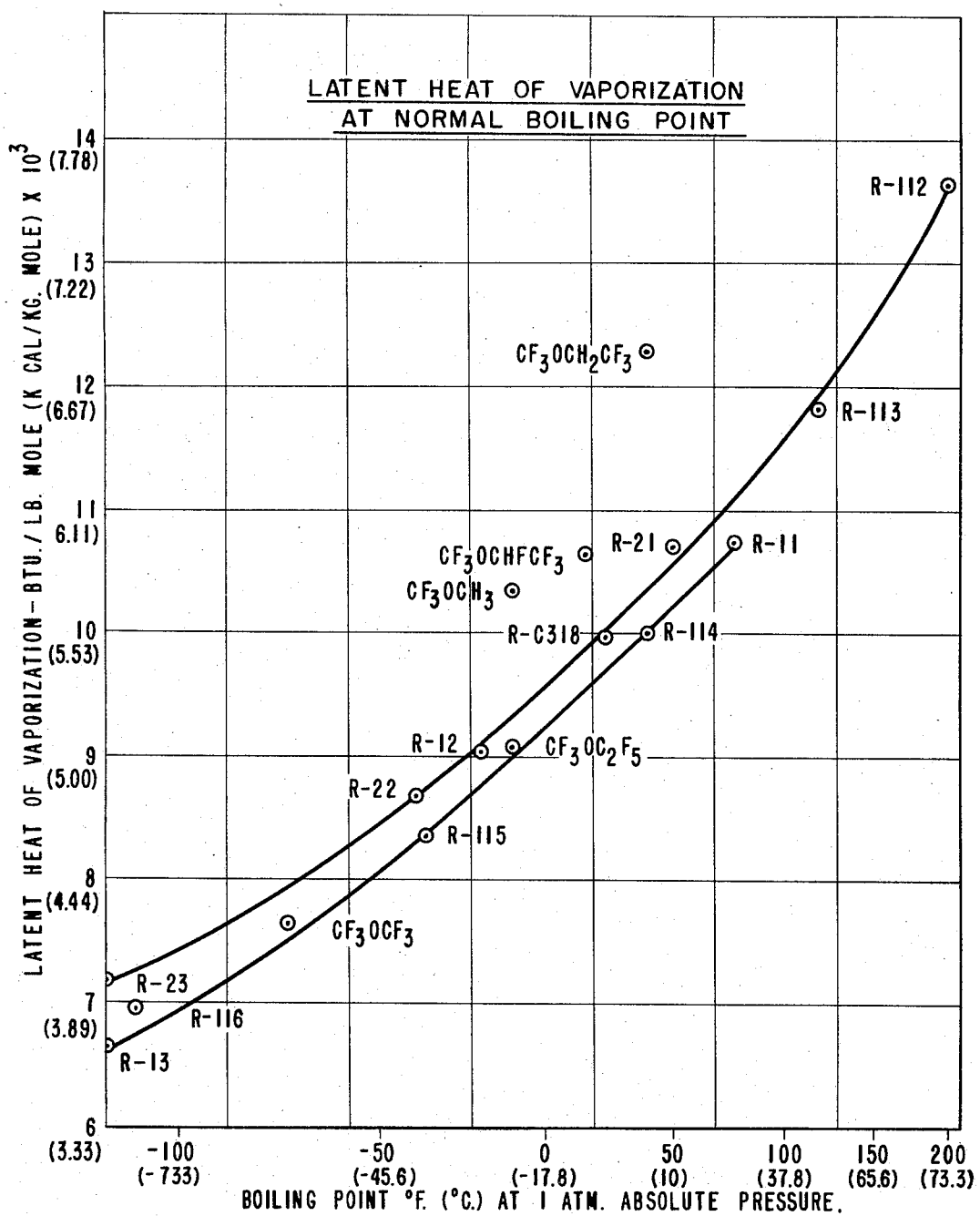

3,362,180
CHEMICAL PROCESS
Bernhardt J. Eiseman, Jr., Wilmington, Del., assignor to E. I. du Pont de Nemours and Company, Wilmington, Del., a corporation of Delaware
Filed Aug. 25, 1965, Ser. No. 482,500
6 Claims. (Cl. 62—112)

The present invention is directed to a process for refrigeration. More particularly, this invention is directed to a process for refrigeration employing a selected fluorinated material as the refrigerant.

Mechanical refrigeration systems are usually designed to accomplish their cooling function by the vaporization of a refrigerant liquid; that is, the cooling is produced by the absorption in the evaporator of the heat required to vaporize the refrigerant liquid. Accordingly a liquid which possesses a high latent heat of vaporization is highly desirable for refrigeration, cooling and air-conditioning applications. An important advantage derived from the use of a refrigerant with a high latent heat of vaporization is that relatively little refrigerant is required. The less refrigerant required results in economic gains both in the cost of the refrigerant and in the cost of the refrigerating equipment, since smaller units can be designed. These factors can be important in situations, such as cold storage warehouses, where a liquid refrigerant is distributed to a number of evaporators for cooling at points some distance from the compressor and condenser installation. Moreover, usually smaller and less costly piping and other handling equipment will be required where a refrigerant having a high latent heat of vaporization is used.

In assessing the effectiveness and efficiency of a refrigerant, the latent heat of vaporization is not the only factor to be considered. The liquid refrigerant which enters the evaporator (through the expansion device) is always above evaporator temperature and may actually be at condenser temperature. A part of the latent heat of vaporization, therefore, is required to cool this liquid to the evaporator temperature. Thus, the latent heat of vaporization of the refrigerant does not give a truly accurate determination of the capacity of a refrigerant. Accordingly, the concept called "net refrigerating effect" has been originated which is the difference in B.t.u./lb. mole between the latent heat of vaporization at the evaporator temperature and the sensible heat required to cool the refrigerating liquid from the condensing temperature to the evaporator temperature. By showing this difference, the net refrigerating effect provides a much fairer comparison among refrigerants than the latent heat of vaporization. Furthermore, since latent heat of vaporization varies with the boiling point of the liquid, comparisons should be made among refrigerants having about the same normal boiling point.

The lower fluoro and fluorochloro hydrocarbons have long been used as refrigerants because of their combination of desirable properties for this application. These fluoro and fluorochloro hydrocarbons, possessing boiling points in the right range for refrigeration applications, are of low toxicity, high stability, non-flammable, and free from objectionable odor. These refrigerants, however, have a relatively low latent heat of vaporization and hence a low net refrigerating effect. Although they are widely used despite this deficiency because of the suitability of their other properties, they leave room for improvement in the magnitude of their net refrigerating effect.

Such substances as water and ammonia have high latent heats of vaporization, but other unfavorable properties limit their use as refrigerants. For example, water has too high a freezing point and boiling point and must be used in an extremely low pressure evaporator even to reach air-conditioning temperatures. Furthermore, the use of water as a refrigerant would involve problems associated with vacuum operations and the serious problem of the corrosive action of water. Ammonia is suffocating and toxic and it too readily corrodes copper.

It is, therefore, an object of this invention to provide an improved process of refrigeration.

Another object is to provide a process employing a refrigerant having a high net refrigerating effect and suitable freezing and boiling points.

These and other objects will become apparent from the following description and claims.

More specifically, the present invention is directed to a process for transferring heat in a refrigerating cycle which comprises (A) condensing a refrigerant compound having the formula $CF_3OC_nH_mF_{(2n-m+1)}$ wherein $n$ is an integer from 1 to 2 and $m$ is an integer from 1 to 3, and
(B) thereafter evaporating the refrigerant compound in the vicinity of a body to be cooled.

The compounds used as refrigerants in the present invention are trifluoromethyl methyl ether, trifluoromethyl fluoromethyl ethers having 1 or 2 atoms of hydrogen, and trifluoromethyl fluoroethyl ethers having from 1 to 3 atoms of hydrogen. Specific compounds of the dimethyl ether type so defined are $CF_3OCHF_2$, $CF_3OCH_2F$, and $CF_3OCH_3$; and compounds of the methyl ethyl ether type are $CF_3OCHFCF_3$, $CF_3OCF_2CHF_2$, $CF_3OCH_2CF_3$, $CF_3OCF_2CH_2F$, $CF_3OCHFCHF_2$, $CF_3OCH_2CHF_2$ $CF_3OCHFCH_2F$ and $CF_3OCF_2CH_3$. All of these compounds have a high latent heat of vaporization relative to the fluoro and fluorochloro carbon refrigerants heretofore used in processes of refrigeration. This property, together with desirable boiling points, makes the compounds of this invention particularly attractive for use as refrigerants.

The hydrofluoroethers of the subject invention are prepared by those skilled in the art according to the following general procedures. Difluoromethyl trifluoromethyl ether, $CF_3OCHF_2$, and fluoromethyl trifluoromethyl ether, $CF_3OCH_2F$, are prepared by the electrolysis of dimethyl sulfate in liquid hydrogen fluoride. (See Chemical Abstracts, 55, 23312b, 27012i and 27013a.) Trifluoromethyl methyl ether, $CF_3OCH_3$, on the other hand, is produced by reacting methanol with carbonyl fluoride to yield methyl fluoroformate which when reacted with sulfur tetrafluoride gives the ether $CF_3OCH_3$. (See Aldrich et al., J. Organic Chemistry, 29, 11 [1964].)

The trifluoromethyl ethyl ethers are prepared by the following procedures. Trifluoromethyl 1,2,2,2-tetrafluoroethyl ether, $CF_3OCHFCF_3$, is prepared by placing 2-trifluoromethoxytetrafluoropropionyl fluoride in a reaction flask cooled to —60° C. together with a 50% by weight aqueous potassium hydroxide solution. The excess water in the mixture is then removed by evaporation under vacuum. The resulting salt is heated to 230° C. and the products distilling from the mixture are condensed. The product is essentially trifluoromethyl 1,2,2,2-tetrafluoroethyl ether as determined by gas chromatography.

Trifluoromethyl 1,1,2,2-tetrafluoroethyl ether, $$CF_3OCF_2CHF_2$$

trifluoromethyl 1,1,2-trifluoroethyl ether, $CF_3OCF_2CH_2F$, and trifluoromethyl 1,1-difluoroethyl ether, $CF_3OCF_2CH_3$, are prepared as follows:

A suspension is formed of anhydrous cesium fluoride in acetonitrile containing difluoroacetyl fluoride, fluoroacetyl fluoride, or acetyl fluoride (depending on which ether is desired). Into this suspension at 0° C. is bubbled carbonyl fluoride to form the trifluoromethyl ester of the acetic acid corresponding to acetyl fluoride used. The cesium fluoride is taken in molar excess over the acetyl fluoride used. The reaction mass is raised to room temperature and the excess of carbonyl fluoride is vented. Now the mixture is cooled to −70° C., 0.5 mole of sulfur tetrafluoride per mole of acetyl fluoride is added, and the reaction mass is heated under autogenous pressure from 100° C. to 150° C. for at least 3 to 4 hours. The product is cooled and the desired ether is separated by fractional distillation.

Trifluoromethyl 2,2,2-trifluoroethyl ether, $$CF_3OCH_2CF_3$$

and trifluoromethyl 2,2-difluoroethyl ether, $$CF_3OCH_2CHF_2$$

are prepared by heating at 100° C. to 150° C. for 8 to 16 hours 2,2,2-trifluoroethanol or 2,2-difluoroethanol (depending on the ether desired) with a molar excess of carbonyl fluoride to form 2,2,2-trifluoroethyl fluoroformate or 2,2-difluoroethylformate. The mass is then cooled to room temperature and the excess carbonyl fluoride vented. Thereafter, the temperature of the mass is lowered to −80° C and 1.5 moles of sulfur tetrafluoride added per mole of ethanol. The mass is heated under autogenous pressure at 150° C. to 200° C. for 8 to 16 hours. Thereafter, the reaction mass is cooled and the desired product separated by fractional distillation.

Trifluoromethyl 1,2,2-trifluoroethyl ether, $$CF_3OCHFCHF_2$$

may be produced by hydrogenating trifluoromethyl trifluorovinyl ether at 150° C. to 200° C. at one atmosphere pressure in the presence of 0.5% palladium on aluminum oxide.

Trifluoromethyl 1,2-difluoroethyl ether, $$CF_3OCHFCH_2F$$

may be produced by bubbling trifluoromethyl vinyl ether into a carbon tetrachloride solution of bromine at room temperature to form trifluoromethyl 1,2-dibromoethyl ether. The product is separated from the carbon tetrachloride by distillation. The product is then treated under anhydrous conditions in methylpyrrolidone with anhydrous potassium fluoride at 100° C. to 150° C. to replace the bromine with fluorine to yield the desired ether.

The unique results of the hydrofluoroethers of this invention as refrigerants are best illustrated by referring to the accompanying figure. The figure graphically compares the latent heats of vaporization of the compounds utilized in the invention process with those of a series of fluorinated compounds widely used as refrigerants. In this figure, the molar heat of vaporization in B.t.u./pound mole (or kcal./kg. mole) is plotted as ordinate against the reciprocal of the boiling point of the refrigerant on the abscissa. The boiling point is measured at one atmosphere absolute pressure as measured on the absolute Fahrenheit scale (Rankine scale of temperature). The abscissa scale, however, is marked in Fahrenheit and centigrade temperatures. The standard refrigerants, designated with the universal R numbers as explained below, all lie on a relatively narrow band, while the fluoroethers utilized in the present invention lie a significant distance above this band indicating that they have a significantly higher latent heat of vaporization than the know refrigerants.

The chemical identities of the standard refrigerants shown in the figure are as follows:

R–23 = $CHF_3$, trifluoromethane
R–13 = $CClF_3$, chlorotrifluoromethane
R–116 = $CF_3CF_3$, hexafluoroethane
R–22 = $CHClF_2$, chlorodifluoromethane
R–115 = $CClF_2CF_3$, chloropentafluoroethane
R–12 = $CCl_2F_2$, dichlorodifluoromethane R–C318 = $CF_2CF_2CF_2CF_2$ , cycloperfluorobutane R–114 = $CClF_2CClF_2$, 1,2-dichlorotetrafluoroethane
R–21 = $CHCl_2F$, dichlorofluoromethane
R–11 = $CCl_3F$, trichlorofluoromethane
R–113 = $CCl_2FCClF_2$, 1,1,2-trichlorotrifluoroethane
R–112 = $CCl_2FCCl_2F$, 1,1,2,2-tetrachlorodifluoroethane As heretofore discussed, for the true relative net refrigerating effect of a refrigerant the latent heat of vaporization must be corrected for the sensible heat required to cool the liquid refrigerant from the condensing temperature to the evaporator temperature. When this is done for the hydrofluoroether compounds of the present invention, a marked and unexpected improvement is noted in the net refrigerating effect which is totally unexpected in view of the performance of the known refrigerants. For example, the net refrigerating effect of trifluoromethyl 2,2,2-trifluoroethyl ether, $CF_3OCH_2CF_3$, compared to that of 1,2-dichloro-1,1,2,2-tetrafluoroethane is given below in Table I. Both refrigerants can be appropriately compared since they have roughly the same boiling point.

TABLE I.—COMPARISON OF REFRIGERATING EFFECT OF $CF_3OCH_2CF_3$  AND $CClF_2CClF_2$ (R–114)

[Evaloration temperature, 42° F.; condensation temperature, 100° F.

| | Mol. Wt. | B.P., °F. | Latent Heat of Vaporization, B.t.u. lb. mole (clac'd.) | Heat for Cooling Liquid from 100° F. to 42° F. | Net Refrigerating Effect, B.t.u./ lb. mole | Percent Gain |
|---|---|---|---|---|---|---|
| $CF_3OCH_2CF_3$  | 168 | 42 | 12,300 | 3,770 | 8,530 | 18 |
| $CClF_2CClF_2$ | 171 | 39 | 10,100 | 2,880 | 7,220 | |

The 18% greater net refrigerating effect (either on a mole basis or weight basis, since the molecular weights of the two refrigerants are nearly the same) for the fluoroether of this invention over the fluorochlorocarbon is totally unexpected. For this compilation, the latent heat of vaporization for both materials was calculated from the slope of the vapor pressure curve near the evaporator temperature by means of the Clausius-Clapeyron equation. The heat capacity of the liquids was computed by using the method of Wenner, "Thermochemical Calculations," McGraw-Hill Co. (1941), p. 16.

The higher net refrigerating effect of trifluoromethyl 2,2,2-trifluoroethyl ether as compared with 1,2-dichlorotetrafluoroethane provides a correspondingly higher refrigerating capacity with any given compressor. This improvement in capacity is accomplished without any increase in pressure and is in contrast to the usual way in which capacity is increased, that of going from a single refrigerant to a minimum-boiling azeotrope where gains in compressor capacity are always obtained by increasing the pressure with attendant increase in the amount of refrigerant handled by the compressor.

Similarly when the net refrigerating effect of trifluoromethyl 1,2,2,2-tetrafluoroethyl ether, $CF_3OCHFCF_3$, is compared with cycloperfluorobutane, the results shown in Table II, below, are obtained. In this comparison, the fluoroether of the present invention is seen to have a 17% greater net refrigerating effect than cycloperfluorobutane.

TABLE II.—COMPARISON OF REFRIGERATING EFFECT OF CF₃OCHFCF₃ AND CF₂CF₂CF₂CF₂ (R-C318)

[Evaporation temperature, 15° F.; condensation temperature, 100° F.]

| | Mol. Wt. | B.P., °F. | Latent Heat of Vaporization B.t.u./lb. mole (calc'd.) | Heat for Cooling Liquid from 100° F. to 15° F., B.t.u./lb. mole | Net Refrigerating Effect, B.t.u./lb. mole | Percent Gain |
|---|---|---|---|---|---|---|
| $CF_3OCHFCF_3$ | 186 | 15 | 10,640 | 5,750 | 4,890 | 17 |
| $CF_2CF_2CF_2CF_2$ | 200 | 21 | 9,900 | 5,710 | 4,190 | |

Trifluoromethyl methyl ether possesses a substantial increase in the latent heat of vaporization for a compound having its boiling temperature as shown in the figure. This compound has a latent heat of vaporization of 10,360 B.t.u./pound mole as compared with 9,300 B.t.u./pound mole for a fluoro or fluorochlorocarbon having the same boiling point and falling in the standard refrigerant band.

The perfluoroethers, $CF_3OCF_3$ and $CF_3OC_2F_5$, on the other hand, which are analogous to the hydrogen-containing fluoroethers of the present invention, exhibit latent heats of vaporization which are expected for fluorocarbons having their boiling temperatures. Their latent heats of vaporization are also shown in the accompanying figure.

From the above, it can be seen that the fluoroethers of the present invention are particularly adapted for use as refrigerants to provide a substantial increase in the net refrigerating effect over existing refrigerants.

The process steps of refrigeration are well known, essentially involving a process for transferring heat by repeatedly compressing and condensing the fluoroether in a closed system and thereafter evaporating the refrigerant compound in the vicinity of a body to be cooled.

It is to be understood that the preceding discussion is representative and that the specific embodiments exemplified may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the present invention in which an exclusive property or privilege is claimed are defined as follows:

1. A process for producing refrigeration which comprises
   (A) condensing a refrigerant compound have the formula
   $$CF_3OC_nH_mF_{(2n-m+1)}$$
   wherein $n$ is an integer from 1 to 2 and $m$ is an integer from 1 to 3, and
   (B) thereafter evaporating said refrigerant compound in the vicinity of a body to be cooled.
2. The process of claim 1 wherein the refrigerant compound is $CF_3OCH_3$.
3. The process of claim 1 wherein the refrigerant compound is $CF_3OCHFCF_3$.
4. The process of claim 1 wherein the refrigerant compound is $CF_3OCH_2CF_3$.
5. The process of claim 1 wherein the refrigerant compound is $CF_3OCHF_2$.
6. The process of claim 1 wherein the refrigerant compound is $CF_3OCF_2CHF_2$.

References Cited
UNITED STATES PATENTS
2,500,388   3/1950   Simons _____ 252—67 X
3,189,621   6/1965   Harnik.

LEON D. ROSDOL, *Primary Examiner.*

S. D. SCHWARTZ, *Assistant Examiner.*